(12) United States Patent
Fisher et al.

(10) Patent No.: US 8,234,175 B2
(45) Date of Patent: Jul. 31, 2012

(54) DEVICE, SYSTEM, AND METHOD OF COLLABORATIVE DISTRIBUTION OF DIGITAL MERCHANDISE

(75) Inventors: Amit Fisher, Nofit (IL); Dagan Gilat, Zichron Yaakov (IL); Gal Shachor, Yokneam (IL); Pnina Vortman, Haifa (IL); Segev Eliezer Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 12/060,277

(22) Filed: Apr. 1, 2008

(65) Prior Publication Data

US 2009/0248535 A1    Oct. 1, 2009

(51) Int. Cl.
*G06Q 30/00*    (2006.01)
(52) U.S. Cl. ...................................................... 705/26.1
(58) Field of Classification Search ................... 705/26, 705/27, 26.1
See application file for complete search history.

(56) References Cited

U.S. PATENT DOCUMENTS

| | | |
|---|---|---|
| 2005/0091160 A1 | 4/2005 | Kitze |
| 2005/0125165 A1 | 6/2005 | Edmondson |
| 2006/0294571 A1 | 12/2006 | Moore |
| 2007/0038931 A1 | 2/2007 | Allaire |
| 2007/0136608 A1 | 6/2007 | Kirovski |
| 2007/0150359 A1 | 6/2007 | Lim |
| 2007/0226368 A1 | 9/2007 | Strickland |
| 2008/0222734 A1* | 9/2008 | Redlich et al. ................... 726/26 |

OTHER PUBLICATIONS

P2P revenue engine, Distributed Computing Industry Association, 2007 http://dcia.info/documents/P2PRE.pdf.
Scott Kirsner, "Getting Paid: Sites that Help Filmmakers and Video Producers Make Money", ScottKirsner.com Website, Sep. 21, 2007. http://www.scottkirsner.com/webvid/gettingpaid.htm.
Robert Cringley, "P2P revenue sharing", I Cringley website, Apr. 2007. http://www.pbs.org/cringely/pulpit/2007/pulpit_20070420_001960_comments.html.

* cited by examiner

*Primary Examiner* — Mila Airapetian (57) ABSTRACT

Device, system, and method of collaborative distribution of digital merchandise. For example, an apparatus for collaborative distribution of Digital Merchandise Items (DMIs) includes: a first computing device having an agent module to receive a command of a first user to purchase a DMI from a second user, to provide information to process a first electronic payment from the first user to the second user, to receive the DMI from a second computing device of the second user, to receive a confirmation that a second electronic payment was made from a third user to the first user, to transfer a copy of the DMI from the first computing device to a third computing device of the third user, to calculate a first portion of the second electronic payment to be maintained by the first user, to calculate a second portion of the second electronic payment to be transferred to the second user, and to provide information to process an electronic payment of the second portion from the first user to the second user.

20 Claims, 3 Drawing Sheets

DEVICE, SYSTEM, AND METHOD OF COLLABORATIVE DISTRIBUTION OF DIGITAL MERCHANDISE

COPYRIGHT & TRADEMARK NOTICES

A portion of the disclosure of this patent document may contain material subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

FIELD

Some embodiments of the invention are related to the field of distribution of digital items.

BACKGROUND

Some electronic communication systems and global communication networks (e.g., the Internet and the World Wide Web) allow illegal sharing of digital files among users. For example, a first user may legally purchase a digital file (e.g., an audio file, a video file, an electronic book, or a software application), and may illegally transfer to a second user a digital copy of the digital file.

Typically, the entity which owns the legal rights in the digital file is not compensated for such illegal distribution ("piracy"). As a result, the price for legally purchasing the digital item may be increased, in order to compensate the rights owner for the losses resulting from piracy. The price increase, in turn, further increases the incentive of users to illegally obtain a copy of the digital file instead of legally purchasing the high-priced digital file.

Piracy further entails risks to the users who obtain illegal copies of the digital file. For example, some illegal copies may include malicious programs, e.g., a computer virus, a "spyware" module, or a fraud facilitating module. Furthermore, some users who attempt to obtain an illegal copy of the digital file may be exposed to undesirable materials, e.g., pornographic or offensive content, which may be provided by unauthorized distributors instead of or in addition to the illegal copy of the digital file.

SUMMARY

Some embodiments include, for example, devices, systems, and methods of collaborative distribution of digital merchandise.

In some embodiments, for example, an apparatus for collaborative distribution of Digital Merchandise Items (DMIs) includes: a first computing device having an agent module to receive a command of a first user to purchase a DMI from a second user, to provide information to process a first electronic payment from the first user to the second user, to receive the DMI from a second computing device of the second user, to receive a confirmation that a second electronic payment was made from a third user to the first user, to transfer a copy of the DMI from the first computing device to a third computing device of the third user, to calculate a first portion of the second electronic payment to be maintained by the first user, to calculate a second portion of the second electronic payment to be transferred to the second user, and to provide information to process an electronic payment of the second portion from the first user to the second user.

In some embodiments, a method of collaborative distribution of Digital Merchandise Items (DMIs) includes: receiving in a first computing device a command of a first user to purchase a DMI from a second user; providing information to process a first electronic payment from the first user to the second user; receiving the DMI from a second computing device of the second user; receiving a confirmation that a second electronic payment was made from a third user to the first user; transferring a copy of the DMI from the first computing device to a third computing device of the third user; calculating a first portion of the second electronic payment to be maintained by the first user; calculating a second portion of the second electronic payment to be transferred to the second user; and providing information to process an electronic payment of the second portion from the first user to the second user.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a portable audio player, a portable video player, a portable audio/video player, a portable media player, an Ultra Mobile Device (UMD), an Ultra Mobile Personal Computer (UMPC), a Mobile Internet Device (MID), an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry™, Palm™ Treo™), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth™, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3.5G, or the like. Some embodiments may be used in conjunction with various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

The terms "social network" or "virtual social network" or "VSN" as used herein include, for example, a virtual community, an online community, a community or assembly of online representations corresponding to users of computing devices, a community or assembly of virtual representations corresponding to users of computing devices, a community or assembly of virtual entities (e.g., avatars, usernames, nicknames, or the like) corresponding to users of computing devices, or the like.

In some embodiments, a virtual social network includes at least two users; in other embodiments, a virtual social network includes at least three users. In some embodiments, a virtual social network includes at least one "one-to-many" communication channels or links. In some embodiments, a virtual social network includes at least one communication channel or link that is not a point-to-point communication channel or link. In some embodiments, a virtual social network includes at least one communication channel or link that is not a "one-to-one" communication channel or link.

The terms "social network services" or "virtual social network services" as used herein include, for example, one or more services which may be provided to members or users of a social network, e.g., through the Internet, through wired or wireless communication, through electronic devices, through wireless devices, through a web-site, through a stand-alone application, through a web browser application, or the like. In some embodiments, social network services may include, for example, online chat activities; textual chat; voice chat; video chat; Instant Messaging (IM); non-instant messaging (e.g., in which messages are accumulated into an "inbox" of a recipient user); sharing of photographs and videos; file sharing; writing into a "blog" or forum system; reading from a "blog" or forum system; discussion groups; electronic mail (email); folksonomy activities (e.g., tagging, collaborative tagging, social classification, social tagging, social indexing); forums; message boards; or the like.

The terms "web" or "Web" as used herein includes, for example, the World Wide Web; a global communication system of interlinked and/or hypertext documents, files, web-sites and/or web-pages accessible through the Internet or through a global communication network; including text, images, videos, multimedia components, hyperlinks, or other content.

The terms "digital merchandise" or "digital merchandise item" or "DMI" or "digital content" include, for example, a digital item which is the subject of a sale transaction and/or a purchase transaction; a software application; a computer file; an executable file; an installable file or software application; a set of files; an archive of one or more files; an audio file (e.g., representing music, a song, or an audio album); a video file or audio/video file (e.g., representing a movie, a movie or a movie clip); an image file; a photograph file; a set of image or photograph files; a compressed or encoded file; a computer game; a computer application; a utility application; a data file (e.g., a word processing file, a spreadsheet, or a presentation); a multimedia file; an electronic book (e-book); a combination or set of multiple types of digital items; or the like.

The term "initiator" as used herein includes, for example, a person or entity that creates a DMI; a person or entity that manufactures or makes a DMI; a person or entity that produces a DMI; a person or entity that creates the original DMI; a person or entity that has (e.g., by ownership or by exclusive license) the legal rights, the copyright and/or the Intellectual Property (IP) rights of the DMI; a person or entity that introduces the DMI to the market; a person or entity that introduces the DMI to the stream of commerce; or the like. For example, the "initiator" may include an artist, a singer, a performer, a music company, a film studio, a production company, an author, or the like.

The terms "user" or "actor" as used herein include, for example, a person or entity that owns a computing device or a wireless device; a person or entity that operates or utilizes a computing device or a wireless device; or a person or entity that is otherwise associated with a computing device or a wireless device.

The term "friend" as used herein includes, for example, another user; a family member; a relative; an acquaintance; a colleague; a co-worker; a person that the user knows from personal, professional or other backgrounds; a person that the user knows from real-world interaction or meeting; and/or a person that the user knows from virtual interaction and/or virtual meeting (e.g., email exchange, instant messaging, online chat, or the like).

The terms "purchasing", "selling", and "distributing" as used herein include, for example, performing or initiating one or more operations resulting or effecting a purchase, a sale, or a distribution of a DMI; initiating an electronic transaction or process resulting or effecting a purchase, a sale, or a distribution of a DMI; receiving and/or executing a user command to perform operations resulting or effecting a purchase, a sale, or a distribution of a DMI; providing information to process an electronic payment from a purchaser or a purchaser's account to a seller or a seller's account; providing, sending and/or receiving authorization code(s) or confirmation code(s) indicating that a payment was successfully processed; initiating, requesting, or fulfilling a request to perform an electronic purchase and/or an electronic payment; and/or other suitable operations to implement electronic or online purchase transactions.

At an overview, some embodiments include devices, systems, and methods of collaborative distribution of Digital Merchandise Items (DMIs), e.g., music, videos, electronic books, software applications, or the like.

For example, a DMI is created by an initiator. The initiator (or another person, entity or agent on his behalf) offers the DMI for sale to one or more users, for example, using one or more online stores (e.g., similar to "Amazon" or "AppleStore", or by publishing details about the DMI in a Web-log ("blog") or other web-page or virtual location). In some embodiments, the initiator need not necessarily publish details about the DMI in a virtual location; for example, the initiator may locally store the original DMI in his computing device or mobile device, and may orally (or otherwise) notify one or more other users about the DMI.

Optionally, the DMI sale price is set by the initiator, and is significantly smaller (e.g., less than ten percent) than prices of conventionally-distributed DMIs. In some embodiments, the DMI price is set by the initiator and remains substantially constant as copies of the DMI are further sold and distributed. In other embodiments, the DMI price may change and need not necessarily remain constant as copies of the DMI are further sold and distributed. For example, in some embodiments, a reseller or distributor may resell copies of the DMI at a price different from (e.g., larger or smaller than) the price that he paid for the DMI. In some embodiments, minimum price and/or maximum price may be set by the initiator for each resale of the DMI. In some embodiments, a minimum payment portion is required to be passed to the initiator for each resale of the DMI, even if the DMI price changes. Other suitable pricing schemes and/or payment division schemes may be used.

Each user who purchases the DMI receives a right to use the DMI (e.g., a right to play the audio file, play the video file, read the electronic book, or use the software application); and automatically receives a right to further sell one or more copies of the DMI to other users. The sale price received for such further sale is divided among all the sellers (including the initiator) that took part in the distribution of the DMI from the initiator to the buyer.

For example, the initiator sells the DMI to user A at a price of ten dollars. Then, user A sells a copy of the DMI to user B at a price of ten dollars; from this amount, two dollars are kept by user A, and eight dollars are transferred upstream and paid to the initiator. Later, user B sells a copy of the DMI to user C at a price of ten dollars; from this amount, two dollars are kept to user B; and the remaining eight dollars are transferred upstream to user A, who keeps a portion and transfer the remainder upstream to the initiator.

A pre-defined price-division scheme ("payment policy") is used to determine the division of the sale price to the relevant participants in the distribution chain. Data describing the payment policy is transferred from each seller to his buyer(s), in conjunction or together with the transfer of the DMI. The system may utilize distributive architecture, in which the computing device of each user ("actor") is able to locally and/or autonomously determine the payment portion to be kept, the payment portion to be transferred upstream, and the identity of the upstream actor to which the payment portion is transferred. These determinations, as well as the actual transfer of payments and division of payments, may be performed in a distributive manner by each actor, without a need to query a central server or a central database.

Some embodiments provide methods and systems for collaborative distribution of DMIs which may be profitable for the initiator as well as for DMI distributors. Some embodiments may thus provide an incentive to users to legally purchase the DMI from the initiator, or to legally purchase copies of the DMI from other users. Since the DMI is sold at a reduced price, and/or since each buyer has the opportunity and the right to be compensated for further distributing copies of the DMI that he purchased, and due to a "long tail effect" of global communication networks, users have an incentive to purchase and optionally re-sell legal copies of the DMI.

Figure 1:
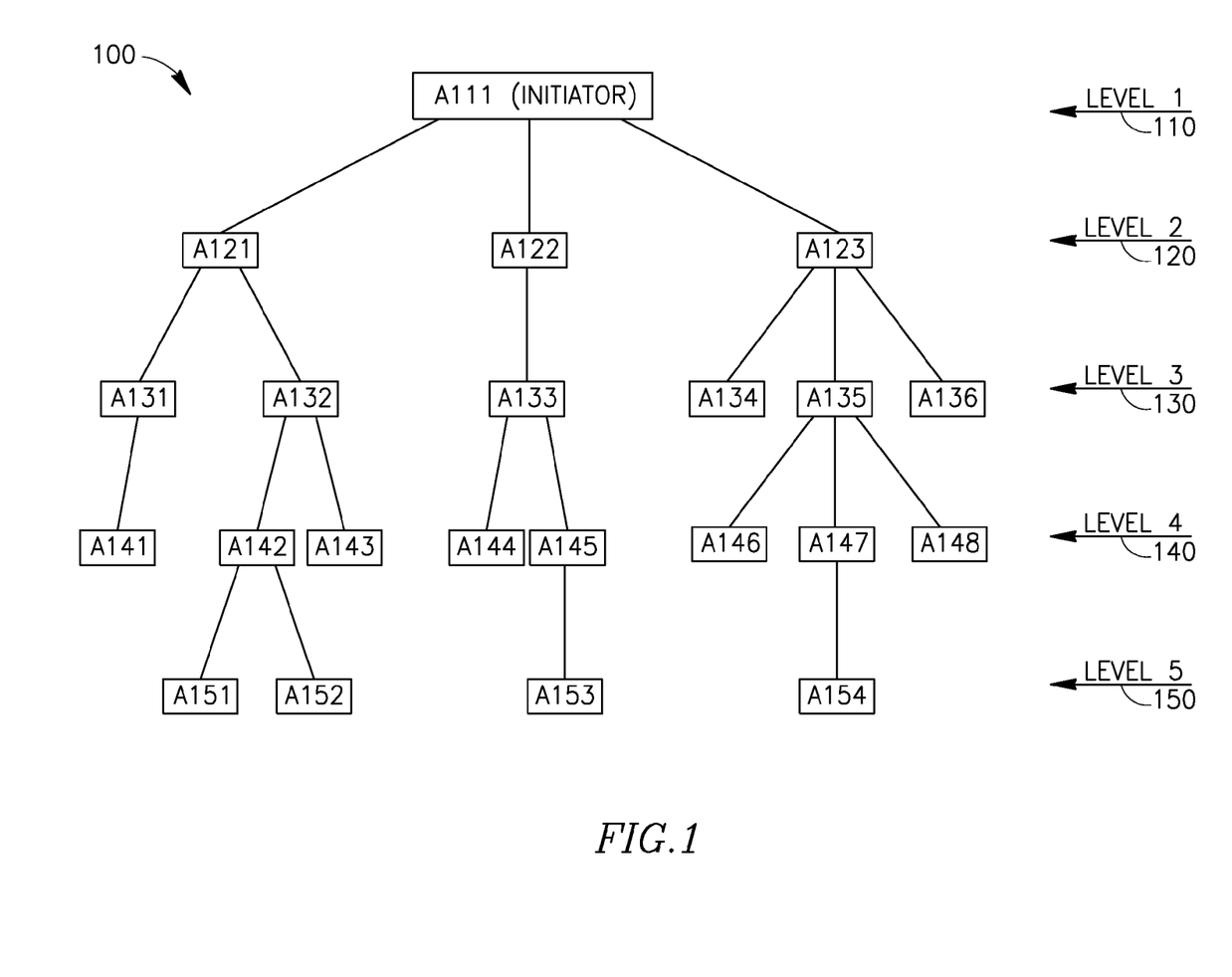
FIG. 1 is a schematic block diagram illustration of a Digital Merchandise Item (DMI) distribution structure, in accordance with some demonstrative embodiments of the invention.

FIG. 1 schematically illustrates a block diagram of a DMI distribution structure 100 (e.g., represented as a directed tree) in accordance with some demonstrative embodiments of the invention. For demonstrative purposes, structure 100 includes five levels, as indicated by arrows 110, 120, 130, 140, and 150. Other number of levels may be used.

Each block in structure 100 represents an actor (denoted "A"). An actor corresponds to a computing device (e.g., a desktop computer, a laptop computer, a cellular phone, a PDA device, or the like) and/or to a user or owner of a computing device.

A line connecting between two actors indicates that a copy of the DMI is transferred (namely, copied and sold) from the actor located at the top end of the line to the actor located at the bottom end of the line.

At the first level, an initiator A111 creates or owns the original DMI. The initiator A111 offers the DMI for sale using one or more online shops or web-sites, at a price set by the initiator A111. For demonstrative purposes, the price may be ten dollars.

As indicated at the first and second levels, each one of three actors (A121, A122, and A123) purchases the DMI from the initiator A111. Each one of these three actors (A121, A122, and A123) pays the price of ten dollars, which is received by the initiator A111. Each one of these there actors (A121, A122, and A123) receives a right to use the DMI (e.g., a right to play the audio file, play the video file, read the electronic book, or use the software application); and automatically receives a right to further sell one or more copies of the DMI to other actors.

As indicated at the second and third levels, each one of actors A131 and A132 purchases a copy of the DMI from actor A121; similarly, an actor A133 purchases a copy of the DMI from actor A122; and each one of actors A134, A135, and A136 purchases a copy of the DMI from actor A123. Each one of the third-level actors (A131 to A136) receives a right to use the DMI (e.g., a right to play the audio file, play the video file, read the electronic book, or use the software application); and automatically receives a right to further sell one or more copies of the DMI to other actors.

When purchasing the copy of the DMI, each one of the third-level actors (A131 to A136) pays the price of ten dollars. The price paid by actor A131 is divided between actor A121 (from whom actor A131 purchased the copy of the DMI) and actor A111 (the initiator). Similarly, the price paid by actor A132 is divided between actor A121 (from whom actor A132 purchased the copy of the DMI) and actor A111 (the initiator). The price paid by actor A133 is divided between actor A122 (from whom actor A133 purchased the copy of the DMI) and actor A111 (the initiator). The price paid by actor A134 is divided between actor A123 (from whom actor A134 purchased the copy of the DMI) and actor A111 (the initiator). The price paid by actor A135 is divided between actor A123 (the initiator) and actor A111 (from whom actor A121 purchased the DMI). The price paid by actor A136 is divided between actor A123 (from whom actor A134 purchased the copy of the DMI) and actor A111 (the initiator).

As indicated at the third and fourth levels, an actor A141 purchases a copy of the DMI from actor A131; similarly, each one of actors A142 and A143 purchases a copy of the DMI from actor A132; each one of actors A144 and A145 purchases a copy of the DMI from actor A133; and each one of actors A146, A147, and A148 purchases a copy of the DMI from actor A135. Actors A134 and A136 do not further distribute copies of the DMI that they purchased.

Each one of the fourth-level actors (A141 to A148) receives a right to use the DMI (e.g., a right to play the audio file, play the video file, read the electronic book, or use the software application); and automatically receives a right to further sell one or more copies of the DMI to other actors.

When purchasing the copy of the DMI, each one of the fourth-level actors (A141 to A148) pays the price of ten dollars. The price paid by actor A141 is divided among multiple actors: actor A131 (from whom actor A141 purchased the copy of the DMI); actor A111 (the initiator); and optionally also actor A121 (who purchased the DMI from the initiator A111 and then sold a copy of the DMI to actor A131). Similarly, the price paid by each one of actors A142 and A143 is divided among multiple actors: actor A132 (from whom each one of actors A142 and A143 purchased the copy of the DMI); actor A111 (the initiator); and optionally also actor A121 (who purchased the DMI from the initiator A111 and then sold a copy of the DMI to actor A132). The price paid by each one of actors A144 and A145 is divided among multiple actors: actor A133 (from whom each one of actors A144 and A145 purchased the copy of the DMI); actor A111 (the initiator); and optionally also actor A122 (who purchased the DMI from the initiator A111 and then sold a copy of the DMI to actor A133). The price paid by each one of actors A146, A147, and A148 is divided among multiple actors: actor A135 (from whom each one of actors A146, A147, and A148 purchased the copy of the DMI); actor A111 (the initiator); and optionally also actor A123 (who purchased the DMI from the initiator A111 and then sold a copy of the DMI to actor A135).

As indicated at the fourth and fifth levels, each one of actors A151 and A152 purchases a copy of the DMI from actor A142; similarly, an actor A153 purchases a copy of the DMI from actor A145; and an actor A154 purchases a copy of the DMI from actor A147. Actors A141, A143, A144, A146, and A148 do not further distribute copies of the DMI that they purchased.

Each one of the fifth-level actors (A151 to A154) receives a right to use the DMI (e.g., a right to play the audio file, play the video file, read the electronic book, or use the software application); and automatically receives a right to further sell one or more copies of the DMI to other actors.

When purchasing the copy of the DMI, each one of the fifth-level actors (A151 to A154) pays the price of ten dollars. The price paid by actor A151 is divided among multiple actors: actor A142 (from whom actor A151 purchased the copy of the DMI); actor A111 (the initiator); and optionally also actor A121 and/or actor A132 (who are in the chain of sale of the DMI from the initiator A111 to actor A151). Similarly, the price paid by actor A152 is divided among multiple actors: actor A142 (from whom actor A152 purchased the copy of the DMI); actor A111 (the initiator); and optionally also actor A121 and/or actor A132 (who are in the chain of sale of the DMI from the initiator A111 to actor A152). The price paid by actor A153 is divided among multiple actors: actor A145 (from whom actor A153 purchased the copy of the DMI); actor A111 (the initiator); and optionally also actor A122 and/or actor A133 (who are in the chain of sale of the DMI from the initiator A111 to actor A153). The price paid by actor A154 is divided among multiple actors: actor A147 (from whom actor A154 purchased the copy of the DMI); actor A111 (the initiator); and optionally also actor A123 and/or actor A135 (who are in the chain of sale of the DMI from the initiator A111 to actor A154).

As shown in structure 100, copies of the DMI are sold or distributed using a directed tree; the root corresponds to the initiator; vertices correspond to actors; and children of a vertex correspond to actors who directly purchased the DMI from that actor. For example, if an actor (denoted Ap) purchases the DMI (or a copy of the DMI) from another actor (denoted As), then the tree structure includes an edge connecting As and Ap (namely, an edge "As→Ap").

A first actor is located "upstream" relative to a second actor if the first actor is in a level higher than the level of the second actor, and also if there is a distribution route that starts with the initiator and includes both the first and second actors. For example, actor A121 is located "upstream" relative to actor A132; and actor A122 is located "upstream" relative to actor A153. In some embodiments, actor A121 is not located "upstream" relative to actor A154; although actor A121 is in the second level and actor A154 is in the fifth level, and although actors A121 and A154 share a common distribution tree 100, they do not share a common distribution route.

Similarly, a first actor is located "downstream" relative to a second actor if the first actor is in a level lower than the level of the second actor, and also if there is a distribution route that starts with the initiator and includes both the first and second actors. For example, actor A132 is located "downstream" relative to actor A121; and actor A153 is located "downstream" relative to actor A122. In some embodiments, actor A154 is not located "downstream" relative to actor A121; although actor A121 is in the second level and actor A154 is in the fifth level, and although actors A121 and A154 share a common distribution tree 100, they do not share a common distribution route.

Transfer of a DMI from a selling actor As to a purchasing actor Ap may include, for example, exchange of one or more messages between actors Ap and As. For example, a first message is sent from the purchasing actor Ap to the selling actor As, requesting a transfer of the DMI (or a copy of thereof) from actor As to actor Ap. In response, and optionally subject to payment of the price and/or subject to the approval of the initiator, a second message is sent from the selling actor As to the purchasing actor Ap. The second message may include multiple fields, objects, or items, for example: a field indicating the transaction time and date (denoted "TT"); the DMI (denoted "C" for Content); a Required Information ("RI") field; and a Payment Policy ("PP") field.

The RI field may include, for example, information that is required regarding the history of the transfer of the DMI from the initiator to the selling actor As. In some embodiments, for example, the RI field includes an identifier of the selling actor As; and optionally an identifier of the initiator. In some embodiments, the RI field may include, for example, identifiers of substantially all the actors that connect the initiator to the selling actor As; as well as time and date information of substantially all past transaction that were performed in the chain of transfer from the initiator to the selling actor As. In some embodiments, the RI field may optionally include substantially full information about the current DMI tree associated with the DMI being sold from actor As to actor Ap.

The PP field may include, for example, data representing a payment policy as set by the initiator. The PP field includes, for example, information or instructions regarding the division or distribution of the price paid by the purchasing actor Ap. In some embodiments, the PP field includes at least a formula to calculate the amount that the purchasing actor Ap can earn for each future distribution of the DMI; and optionally also the amount that will be passed to the selling actor As in all such future transactions. Other data and/or additional data may be included in the PP field, in order to implement a payment division policy as set by the initiator.

In some embodiments, optionally, the request of the purchasing actor Ap to purchase the DMI may be transferred to the initiator, and/or may be subject to approval or rejection by the initiator. This may allow the initiator to forbid transfer of the DMI to specific actors or type of actors. For example, a "personal edition" version of a software DMI may be distributed only to individuals, whereas an "enterprise edition" version of a software DMI may be distributed to for-profit entities. Similarly, some DMIs may be subject to export restrictions, for example, due to DVD region restrictions, patent-related restrictions (e.g., a software DMI may be sold to a purchaser located in a first country, but not to a purchaser located in a second country, due to a patent in the second country), or the like. The request of the purchasing actor Ap to purchase the DMI may be transferred to the initiator directly, or indirectly (e.g., by sending a distribution request up the distribution tree until it reaches the initiator); similarly, the initiator's approval or rejection of the requested transfer may be transferred downstream, directly or indirectly. In other embodiments, the DMI may be re-distributed without the need for pre-approval of each transaction by the initiator.

The transfer of a DMI from a selling actor As to a purchasing actor Ap is accompanied or associated with payment by the purchasing actor Ap. In some embodiments, the payment is performed prior to the DMI transfer, together with the DMI transfer, or shortly after the DMI transfer (e.g., if a particular delayed-payment method is used). In some embodiments, the full price is paid directly to the selling actor As, who then divides the payment to all the previous sellers in the chain of distribution and/or to the initiator. In other embodiments, the full price is paid directly to the selling actor As, who keeps his share and transfers the remainder to the actor from which the selling actor As purchased the DMI, for further division of the remainder. In still other embodiments, the payment is automatically divided by an electronic payment system among the relevant participants in the chain of distribution, and each one of the relevant actors automatically and directly receives his share. In some embodiments, based on the PP, a part of the price paid by the purchasing actor Ap may continue traversing the tree upstream until it reaches the initiator. In some embodiments, payment portions may optionally propagate downstream from the initiator to other actors in the tree; for example, thereby allowing a payment mechanism in which substantially all actors in the tree receive a share for any transaction performed in the tree.

In some embodiments, some or all the actors in a distribution route (namely, a route starting at the initiator and ending at the last selling actor As that sells the DMI to the purchasing actor Ap) may be compensated, and the compensation may optionally vary among actors. In some embodiments, for example, each actor in the distribution route receives a fixed amount, calculated by divided the price of the DMI by the number of sellers in the route; for example, when actor A154 purchases the DMI from actor A147, each one of actors A111 (the initiator), actor A123, actor A135, and actor A147 receives one quarter of the price. In other embodiments, each actor in the distribution route retains a pre-defined percentage of the payment that he receives, and passes the remainder upstream; for example, when actor A154 purchases the DMI from actor A147, the actor A147 keeps eight percent of the payment and passes the remainder upstream to actor A135, who in turn keeps eight percent of the payment that he received and passes the remainder upstream to actor A123, who in turn keeps eight percent of the payment that he received and passes the remainder upstream to the initiator A111.

In other embodiments, a payment is divided (e.g., using fixed shares, using percentages, or otherwise) only among the last K actors in a distribution route, or only among the last K actors and the initiator, wherein K is a positive integer. In yet other embodiments, a payment is divided (e.g., using fixed shares, using percentages, or otherwise) only among the last N percent of actors in a distribution route, or only among the last N percent of actors and the initiator, wherein N is a positive number between zero and 100. Other suitable types of payment schemes may be used, and may be reflected in the PP and the RI field.

In some embodiments, optionally, a DMI may be associated with ratings, scores, feedbacks, user reviews, or other quality indicators. DMI rating data may be managed and maintained by the initiator, and may reach the purchasing actor using one or more ways. For example, in some embodiments, a purchasing actor Ap may send a request for a DMI rating upstream; the request is transferred upstream and reaches the initiator, who in turn sends the DMI rating data to the purchasing actor Ap (e.g., directly, or through other actor(s)). In some embodiments, an actor requesting the DMI rating may be provided with an identifier of the initiator, and may directly contact the initiator to obtain DMI rating data. In still other embodiments, updates to DMI ratings are automatically passed (e.g., substantially immediately) to all actors in the tree, and/or are maintained by each actor in the tree. In some embodiments, updates to DMI rating data is passed instead of or in addition to DMI rating data. In some embodiments, DMI rating data may include, for example, average rating, median rating, standard deviation data, distribution, individual opinions, or the like. In some embodiments, secured or encrypted communication (e.g., using cryptographic algorithms) may be used to prevent tampering with rating information, abuse, or fraud.

In some embodiments, DMI rating data may contribute to a result in which DMI creators (initiators) are compensated based on the rating associated with their respective DMIs. For example, a DMI associated with a high rating score may draw a large audience of purchasers, thereby increasing the revenue of the DMI creator (initiator); whereas a DMI associated with a low rating score may draw only a small audience of purchasers, thereby providing only a small revenue to the DMI creator (initiator).

In some embodiments, optionally, an actor may be associated with ratings, scores, feedbacks, user reviews, or other quality indicators. Actor rating data may represent individual or cumulative satisfaction of past purchasers from performance of an actor, e.g., a purchasing actor or a selling actor. For example, actor rating data may relate to substantially all the DMIs or one or more types of DMIs that were sold by an actor. The actor rating data may thus pertain to substantially all DMI tree structures in which the actor participates. The rating of an actor is determined or entered by other actors who are direct purchasers of DMIs from that actor. Actor rating data may be managed and maintained, and may reach a purchasing actor, using one or more ways, e.g., similar to DMI rating data. In some embodiments, an actor's rating may be calculated based on an aggregation of ratings or scores provided by one or more purchasers who purchased one or more DMIs from that actor; other suitable calculations may be used.

In some embodiments, a popular actor (e.g., a popular Web-log ("blog"), a virtual social network, a virtual hub, a popular web-site) may have greater revenue, since he is associated with a greater social network and may thus expose a greater circle of friends to a DMI that he purchased and further distributes. Similarly, in some embodiments, a highly-rated actor may have greater revenue, since users may prefer to purchase a DMI from a trusted, reliable, or highly-ranked actor.

In some embodiments, DMI preview may be provided by the initiator and/or by other actors, and a purchasing actor may use the preview in order to evaluate whether or not to purchase the DMI. For example, preview of a song may include a twenty-seconds excerpt of the song; preview of a movie may include a movie trailer, or a one-minute excerpt of the movie; preview of a electronic book may include the table of contents, a demonstrative chapter, and/or selected pages; preview of a software may include a trial-period version of the software (e.g., which expires after a trial period), a version of the software having limited features, a version of the software that includes advertisements, or the like.

Some embodiments may utilize client/server architecture, publisher/subscriber architecture, Peer to Peer (P2P) architecture, fully distributed architecture, partially distributed architecture, fully centralized architecture, partially centralized architecture, or other suitable architectures.

Some embodiments may utilize one or more mechanisms to eliminate or minimize privacy risks, security risks, DMI piracy, or other fraud or abuse of the system. For example, some embodiments may utilize encryption, secured socket or secured layer communication, digital signatures, authentication mechanisms, or other suitable fraud-prevention or abuse-prevention mechanism.

In some embodiments, a set of related DMIs may be distributed as a package or as multiple DMIs. For example, an initiator may be able to sell a single song of an artist, an entire music album of the artist, or a subset or group of songs of the artist.

Some embodiments operate differently than conventional Multi-Level Marketing (MLM) methods. For example, in some embodiments, each purchaser of the DMI automatically becomes a distributor or a potential distributor, and/or automatically obtains the legal right to further distribute the purchased DMI. In contrast, a conventional MLM method differentiates between a distributor (who may also purchase the goods from another distributor) and an end-buyer (who purchases the goods for self use but does not obtain any distribution rights). Additionally or alternatively, some embodiments utilize a fully-distributed architecture; whereas a conventional MLM method require, and is governed by, a centralized entity, for example, which calculates royalties, manages the legal agreements with distributors, supplies the goods to end-users and distributors, or the like.

Some embodiments may utilize "Web 2.0" architecture, modules or features, for example, using a Web-based implementation that features DMI rating information and/or actor rating information. In some embodiments, DMI distribution may be performed using web-sites, web-pages, virtual social networks (e.g., "FaceBook", "MySpace", "LinkedIn"), user profiles or user pages in a virtual social network, applications or applets of virtual social networks, browser plug-ins or extensions, Web-log ("blog"), or other locations in the virtual world.

In some embodiments, a tree structure has a single initiator and one or more other actors, such that each actor purchased a copy of the DMI and automatically obtained a right to further sell copies of the DMI. In contrast, some conventional MLM methods utilize three (or more) types of parties, namely: a goods manufacturer (or content publisher) who owns and distributes the goods; affiliates or distributors, who have special agreements with the goods manufacturer to distribute the goods; and end-users, who purchase the goods or view the content, but do not have a right to further distribute the goods, and do not receive benefits from further distribution of the goods. Some embodiments utilize P2P architecture such that DMIs may be distributed from substantially anywhere, and each actor in the distribution path may be able to benefit from further distributions.

In some embodiments, copies of the DMI being distributed are stored locally on computing devices of actors, and may be distributed directly from a selling actor's computing device to a purchasing actor's computing device. In contrast, some conventional MLM methods operate to distribute copies of a content item stored only once in a central repository of the initiator.

In some embodiments, transfer of a DMI copy from a selling actor to a purchasing actor need not pass through a central server; need not pass through a central P2P server or hub; need not request approval or authorization from a central server; and need not request approval or authorization from a central P2P server or hub.

In some embodiments, each actor in the distribution route is compensated for a sale performed in the distribution route. In contrast, some conventional MLM methods compensate only the last actor in the distribution route for a further sale of the goods. Accordingly, some embodiments provide a better incentive for actors to legally distribute the DMI.

In some embodiments, the scheme for division of sale prices of a DMI is stored and reflected in the PP field, and is transferred among actors (e.g., together with the DMI or copies thereof). In contrast, some conventional MLM methods require that a central entity determine how to divide revenue.

In some embodiments, the list of actors who may be able to benefit from the distribution of a DMI is dynamic; for example, an additional actor is added to the tree structure upon his purchase of the DMI, and such added actor has the right to receive a portion of the price that will be paid in a future sale of the DMI that will take place downstream in his distribution right. In contrast, some conventional MLM methods pre-determine in advance (namely, prior to the commencement of the distribution) which entities will receive benefits from future distributions; and the list of entitled entities may be static, closed, non-growing, or otherwise non-changing.

Figure 2:
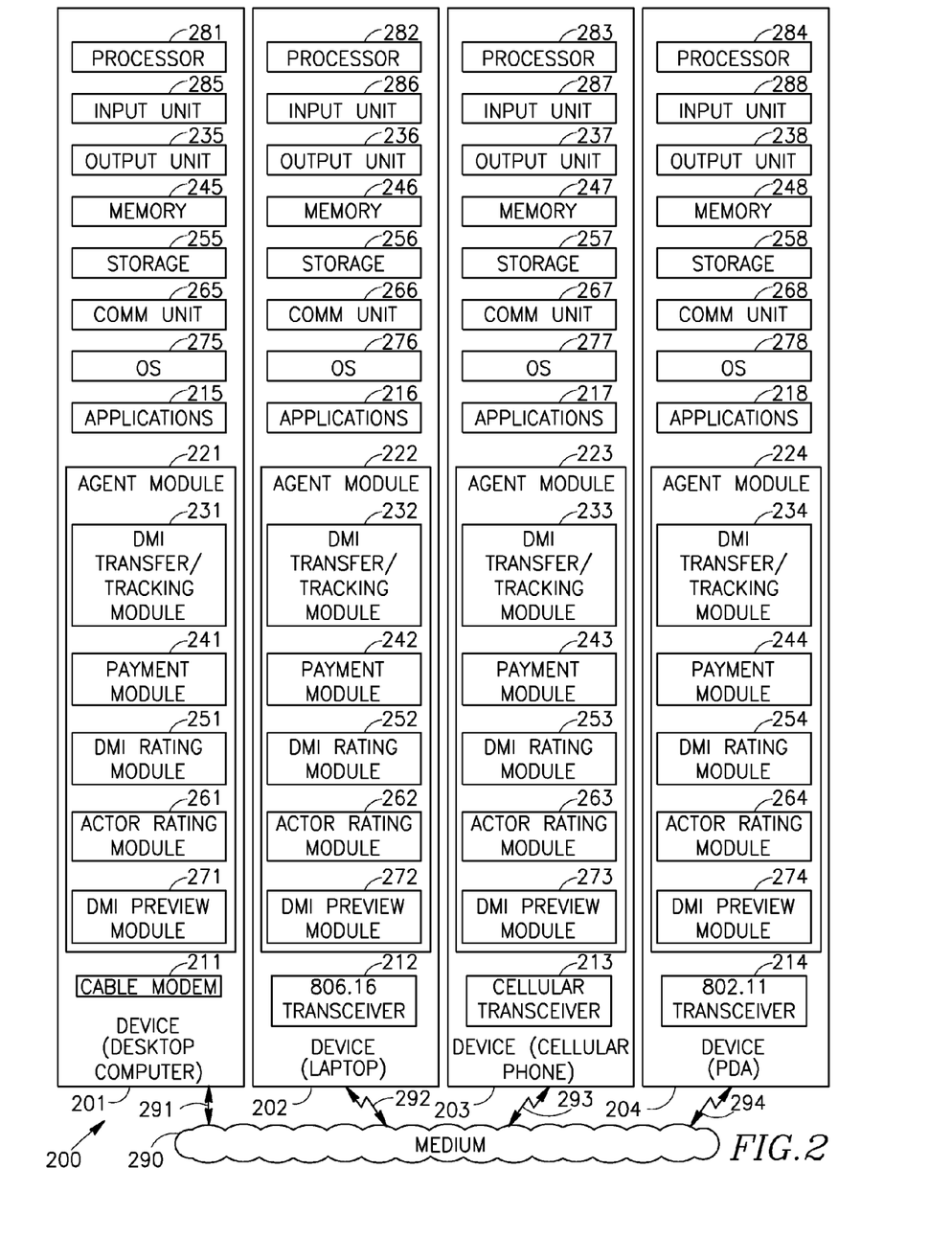
FIG. 2 is a schematic block diagram illustration of a system in accordance with some demonstrative embodiments of the invention.

FIG. 2 schematically illustrates a block diagram of a system 200 in accordance with some demonstrative embodiments of the invention. System 200 includes multiple computing devices, for example, devices 201-204. Each one of devices 201-204 may include a wired computing device or a wireless computing device.

For example, device 201 may be a desktop computer having a cable modem 211; device 202 may be a laptop computer having an IEEE 802.16 transceiver 212; device 203 may be a cellular phone having a cellular transceiver 213; and device 204 may be a PDA device having an IEEE 802.11 transceiver 214. Other suitable devices may be used, and other suitable communication methods may be used.

Devices 201-204 are able to access a communication network 290 through wired and/or wireless links 291-294, respectively. Communication network 290 may include, for example, a global communication network, the Internet, the World Wide Web, a wired network, a wireless network, a combination of one or more wired networks and/or one or more wireless networks, or the like.

Users of devices 201-204 may correspond to some of the actors of FIG. 1. For example, the user of device 201 may correspond to the initiator A111 of FIG. 1; the user of device 202 may correspond to one of the second-level actors (A121) of FIG. 1; and the users of devices 203-204 may correspond to two of the third-level actors (A131 and A132) of FIG. 1.

Device 201 includes an agent module 221 able to perform operations related to DMI distribution. The agent module 221 may be implemented using multiple modules or components, for example, a DMI transfer and tracking module 231, a payment module 241, a DMI rating module 251, an actor rating module 261, and a DMI preview module 271.

The DMI transfer and tracking module 231 is able to perform operations of, for example, purchasing a DMI from an selling actor; selling a DMI to a purchasing actor; obtaining or receiving a DMI from a purchasing actor; transferring a DMI to a purchasing actor; tracking or logging DMI transactions or transfers; or the like.

The payment module 241 is able to perform operations of, for example, paying to a selling actor for a purchased DMI; collecting from a purchaser actor the price of a sold DMI; determining which portion of the collected payment is to be maintained, in accordance with the PP associated with the DMI, and maintaining that portion; determining which portion of the collected payment is to be transferred upstream to the actor from which the DMI was purchased, in accordance with the PP associated with the DMI, and transferring that that portion upstream to the actor from which the DMI was purchased; or the like. In some embodiments, the payment module 241 may be able to perform and/or handle credits and/or debits using a credit card, a debit card, a bank account, a PayPal account, a micro-payment mechanism, a nano-payment mechanism, a virtual-world payment mechanism (e.g., similar to "Second Life" money), or the like.

The DMI rating module 251 is able to perform operations of, for example, storing and/or presenting rating data associated with a DMI purchased by device 201; storing and/or presenting rating data associated with a DMI not yet purchased by device 201; querying and/or obtaining DMI rating data stored in one or more other devices 202-204; searching for DMI rating data stored locally in device 201 and/or stored in one or more other devices 202-204; updating DMI rating data; modifying DMI rating data; performing calculations (e.g., average, median, standard deviation) on DMI rating data; presenting DMI rating data to the user of device 201; transferring DMI rating data to devices 202-204 (e.g., upon their request); receiving DMI rating data from devices 202-204; or the like.

The actor rating module 261 is able to perform operations of, for example, storing and/or presenting rating data associated with a local actor (e.g., the user of device 201) and/or a remote actor (e.g., the user of device 202) and/or multiple users (e.g., users of devices 201-204); storing and/or presenting rating data associated with an actor from which the user of device 201 purchased a DMI; storing and/or presenting rating data associated with an actor from which the user of device 201 did not yet purchase a DMI; querying and/or obtaining actor rating data stored in one or more other devices 202-204; searching for actor rating data stored locally in device 201 and/or stored in one or more other devices 202-204; updating actor rating data; modifying actor rating data; performing calculations (e.g., average, median, standard deviation) on actor rating data; presenting actor rating data to the user of device 201; transferring actor rating data to devices 202-204 (e.g., upon their request); receiving actor rating data from devices 202-204; or the like.

The DMI preview module 271 is able to perform operations of, for example, receiving a request (e.g., from a purchasing actor) to provide a preview of a DMI that device 201 offers for sale (e.g., as initiator or as a non-initiator selling actor); transferring or streaming to the requesting party a preview of the DMI; and optionally, automatically preparing a DMI preview version (e.g., an excerpt) from a full DMI.

Devices 202-204 may include modules similar to the modules of device 201. For example, each one of devices 202-204 may include an agent module 222-224, a DMI transfer and tracking module 232-234, a payment module 242-244, a DMI rating module 252-254, an actor rating module 262-264, and a DMI preview module 272-274.

In some embodiments, the agent module 221, or one or more of its modules (namely, the DMI transfer and tracking module 231, the payment module 241, the DMI rating module 251, the actor rating module 261, and/or the DMI preview module 271) may be able to operate substantially autonomously, or in a substantially fully distributive architecture. For example, the agent module 221, or one or more of its modules, need not contact a centralized server, a single or centralized point of contact, a single or centralized point of authorization, a single or centralized data repository, a single or centralized logic unit, or other single or centralized hub, in order to operate, to transfer a DMI, to purchase a DMI, to sell a DMI, to collect payment for a sold DMI, to calculate or determine division of collected payment, to divide payment received for a sold DMI, to maintain a portion of collected payment, to transfer upstream a portion of collected payment, to handle DMI rating, to handle actor rating, to handle DMI preview, or the like. In some embodiments, the agent module 221, or one or more of its modules, may be in contact (with regard to a particular DMI) only with: the corresponding modules of devices of actors that are located downstream from device 201 (e.g., in order to sell a DMI to purchasing actors downstream), and the corresponding modules of a single selling actor from which the user of device 201 purchased the DMI.

In some embodiments, one or more users of system 200 may utilize remote servers in order to publish the existence of a DMI, or to publish details about a DMI, but not for taking part in the sale or purchase of a DMI or in other DMI-related operations. For example, the user of device 201 may publish details about a DMI in a Web-log ("blog") hosted on a remote server, or in his web-page at a virtual social network (e.g., "FaceBook", "MySpace", "LinkedIn") hosted on a remote server. In some embodiments, such publication may include an identifier (e.g., a username, a nickname, an email address, or the like) that allows potential purchasers of the DMI to directly access the device 201 in a distributive, direct, non-centralized, and/or Peer to Peer (P2P) manner.

In some embodiments, devices 201-204 may include other suitable components or modules, for example, cryptographic modules to allow or handle secure communication, encoding modules, decoding modules, password-protection mechanisms, coders/decoders (codecs), authentication mechanisms or modules, fingerprinting modules, Digital Right Management (DRM) modules, mechanisms to prevent tampering with DMIs or modifying DMIs, mechanisms to prevent or minimize system abuse or fraud, or the like.

In some embodiments, each one of devices 201-204 may be implemented using suitable hardware components and/or software components, for example, a processor 281-284, an input unit 285-288, an output unit 235-238, a memory unit 245-248, a storage unit 255-258, a communication unit 265-268, an Operating System (OS) 275-278, and software applications 215-218.

Each one of processor 281-284 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller.

Each one of input units 285-288 includes, for example, a keyboard, a keypad, a mouse, a touch-pad, a joystick, a track-ball, a stylus, a microphone, or other suitable pointing unit or input device. Each one of output units 235-238 includes, for example, a monitor, a screen, a Cathode Ray Tube (CRT) display unit, a Liquid Crystal Display (LCD) display unit, a plasma display unit, one or more audio speakers or earphones, or other suitable output devices.

Each one of memory units 245-248 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Each one of storage units 255-258 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units.

Each one of communication units 265-268 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, each one of communication units 265-268 includes, or is associated with, one or more antennas.

Figure 3:
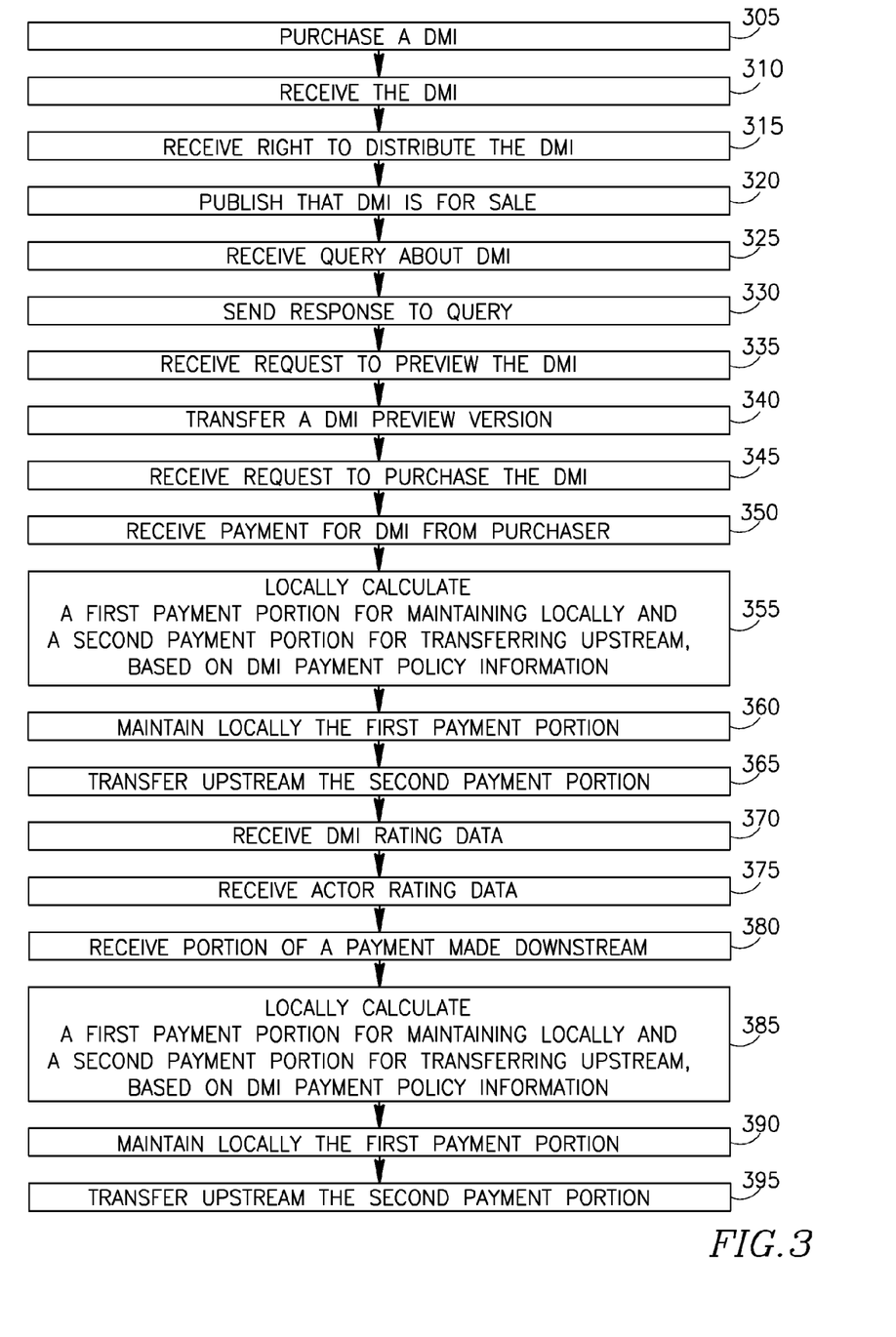
FIG. 3 is a schematic flow-chart of a method of distributing DMIs, in accordance with some demonstrative embodiments of the invention.

In some embodiments, some or all of the components of device 201 are enclosed in a common housing or packaging, and are interconnected or operably associated using one or more wired or wireless links. Similarly, some or all of the components of device 202 are enclosed in a common housing or packaging, and are interconnected or operably associated using one or more wired or wireless links; some or all of the components of device 203 are enclosed in a common housing or packaging, and are interconnected or operably associated using one or more wired or wireless links; and some or all of the components of device 204 are enclosed in a common housing or packaging, and are interconnected or operably associated using one or more wired or wireless links FIG. 3 is schematic flow-chart of a method of distributing DMIs, in accordance with some demonstrative embodiments of the invention. Operations of the method may be used, for example, by an actor of FIG. 1, by system 200 of FIG. 2, and/or by other suitable units, devices and/or systems.

In some embodiments, the method may include, for example, purchasing a DMI (block 305). This may include, for example, transferring a payment of the full price of the DMI from the purchasing actor (or from the device thereof) to the selling actor (or to the device thereof).

In some embodiments, the method may include, for example, receiving the DMI (block 310), e.g., by downloading the DMI, by electronic mail, or the like. This may include, for example, receiving one or more data items associated with the DMI, optionally as an integrated package that includes the DMI, the TT information, the PP information, the RI, or the like.

In some embodiments, the method may include, for example, automatically receiving (e.g., substantially together with receiving the DMI, or substantially together with purchasing the DMI) a legal right to further sell the DMI or copies thereof to other actors (block 315).

In some embodiments, the method may include, for example, publishing (e.g., in a "blog", in a virtual social network, in a web-page) that the DMI is for sale (block 320).

In some embodiments, the method may include, for example, receiving from a potential purchaser a query about the DMI (block 325).

In some embodiments, the method may include, for example, sending a response to the query (block 330).

In some embodiments, the method may include, for example, receiving from a potential purchaser a request to preview the DMI (block 335).

In some embodiments, the method may include, for example, transferring (e.g., sending or streaming) to the potential purchaser a preview version of the DMI (block 340).

In some embodiments, the method may include, for example, receiving from a potential purchaser a request to purchase the DMI (block 345).

In some embodiments, the method may include, for example, receiving from the potential purchaser payment for the full price of the DMI (block 350).

In some embodiments, the method may include, for example, locally calculating which portion of the received payment is to be maintained locally ("maintained portion"), and which portion of the received payment is to be transferred upstream to the actor from whom the DMI was purchased ("upstream-transferred portion") (block 355). This may be performed locally, based on the PP information associated with the DMI.

In some embodiments, the method may include, for example, locally maintaining the maintained portion (block 360).

In some embodiments, the method may include, for example, transferring the upstream-transferred portion to the actor from whom the DMI was purchased (block 365). The transfer may include an indication of the DMI for which the upstream-transferred portion is transferred, and/or an indication of the PP associated with that DMI.

In some embodiments, the method may include, for example, receiving DMI rating data, e.g., from the DMI purchaser (block 370). Optionally, the DMI rating data may be stored locally, transferred upstream, and/or transferred downstream, and may be accessible (directly or indirectly) to other actors.

In some embodiments, the method may include, for example, receiving actor rating data, e.g., from the DMI purchaser (block 375). Optionally, the actor rating data may be stored locally, transferred upstream, and/or transferred downstream, and may be accessible (directly or indirectly) to other actors.

In some embodiments, the method may include, for example, receiving a portion from a payment made downstream between two other actors in the distribution route of another DMI (block 380). For example, the current actor A may receive from another actor B (located directly downstream from A) a portion from a payment made between actors C and D, which are further downstream from A. Optionally, the received portion is accompanied by an indication of the DMI for which the received portion is transferred, and/or an indication of the PP associated with that DMI; or, the relevant PP may already be stored in the local device of the receiving actor, who previously acted as a seller of the relevant DMI.

In some embodiments, the method may include, for example, locally calculating which portion of the received payment is to be maintained locally ("maintained portion"), and which portion of the received payment is to be transferred upstream to the actor from whom the DMI was purchased ("upstream-transferred portion") (block 385). This may be performed locally, based on the PP information associated with the DMI.

In some embodiments, the method may include, for example, locally maintaining the maintained portion (block 390).

In some embodiments, the method may include, for example, transferring the upstream-transferred portion to the actor from whom the DMI was purchased (block 395). The transfer may include an indication of the DMI for which the upstream-transferred portion is transferred, and/or an indication of the PP associated with that DMI.

Other suitable operations or sets of operations may be used in accordance with some embodiments. In some embodiments, some operations may be performed in parallel, in series, or in other suitable orders or execution.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. An apparatus for collaborative distribution of Digital Merchandise Items (DMIs), the apparatus comprising:
a first computing device having an agent module to receive a command of a first user to purchase a DMI from a second user, to provide information to process a first electronic payment from the first user to the second user, to receive the DMI from a second computing device of the second user, to receive a confirmation that a second electronic payment was made from a third user to the first user, to transfer a copy of the DMI from the first computing device to a third computing device of the third user, to calculate a first portion of the second electronic payment to be maintained by the first user, to calculate a second portion of the second electronic payment to be transferred to the second user, and to provide information to process an electronic payment of the second portion from the first user to the second user.

2. The apparatus of claim 1, wherein the agent module is to autonomously calculate the first and second portions.

3. The apparatus of claim 1, wherein the agent module is to calculate the first and second portions independently of another computing device.

4. The apparatus of claim 1, wherein the agent module is to calculate the first and second portions based on payment policy information stored locally in the first computing device.

5. The apparatus of claim 4, wherein the agent module is to receive the payment policy information from the second computing device in conjunction with receipt of the DMI from the second computing device.

6. The apparatus of claim 5, wherein the agent module is to transfer a copy of the payment policy information to the third computing device in conjunction with transfer of the copy of the DMI from the first computing device to the third computing device.

7. The apparatus of claim 1, wherein the agent module comprises:
a DMI rating module to store DMI rating information entered by one or more users and associated with the DMI; and to transfer to another computing device at least a portion of the DMI rating information.

8. The apparatus of claim 1, wherein the agent module comprises:
a user rating module to store user rating information entered by one or more users of one or more computing devices, the user rating information relating to one or more previous DMI transactions performed by a user of the apparatus; and to transfer to another computing device at least a portion of the user rating information.

9. The apparatus of claim 1, wherein the agent module comprises:
a DMI preview module to receive from the third computing device a request to preview the DMI, and to transfer to the third computing device a preview version of the DMI.

10. The apparatus of claim 1, wherein the DMI comprises a DMI selected from the group consisting of: a digital audio file, a digital video file, a digital audio/video file, a digital photograph, a digital image, a data file, an electronic book, and a software application.

11. The apparatus of claim 1, wherein the first computing device comprises a device selected from the group consisting of: a desktop computer, a laptop computer, a tablet computer, a Personal Digital Assistant, a cellular phone, a handheld device, a portable audio player, a portable video player, a portable audio/video player, a portable media player, an Ultra Mobile Device, an Ultra Mobile Personal Computer, and a Mobile Internet Device.

12. A computer-implemented method of collaborative distribution of Digital Merchandise Items (DMIs), the method comprising:
receiving in a first computing device a command of a first user to purchase a DMI from a second user;
providing information to process a first electronic payment from the first user to the second user;
receiving the DMI from a second computing device of the second user;
receiving a confirmation that a second electronic payment was made from a third user to the first user;
transferring a copy of the DMI from the first computing device to a third computing device of the third user;
calculating a first portion of the second electronic payment to be maintained by the first user;
calculating a second portion of the second electronic payment to be transferred to the second user; and
providing information to process an electronic payment of the second portion from the first user to the second user,
wherein any of said steps of calculating are done by a processor.

13. The method of claim 12, wherein calculating the second portion comprises:
calculating the second portion in the first computing device independently of another computing device.

14. The method of claim 12, wherein calculating the second portion comprises:
calculating the second portion based on payment policy information stored locally in the first computing device.

15. The method of claim 14, comprising:
receiving the payment policy information from the second computing device in conjunction with receipt of the DMI from the second computing device.

16. The method of claim 15, comprising:
transferring a copy of the payment policy information from the first computing device to the third computing device in conjunction with transfer of the copy of the DMI from the first computing device to the third computing device.

17. The method of claim 12, comprising:
storing DMI rating information entered by one or more users and associated with the DMI; and
transferring to another computing device at least a portion of the DMI rating information.

18. The method of claim 12, comprising:
receiving from the third computing device a request to preview the DMI; and
transferring to the third computing device a preview version of the DMI.

19. The method of claim 12, wherein the DMI comprises a DMI selected from the group consisting of: a digital audio file, a digital video file, a digital audio/video file, a digital photograph, a digital image, a data file, an electronic book, and a software application.

20. A computer program product comprising a computer useable medium including a computer readable program, wherein the computer readable program when executed on a computer causes the computer to perform a method comprising:
receiving in a first computing device a command of a first user to purchase a DMI from a second user;
providing information to process a first electronic payment from the first user to the second user;
receiving the DMI from a second computing device of the second user;

receiving a confirmation that a second electronic payment was made from a third user to the first user;
transferring a copy of the DMI from the first computing device to a third computing device of the third user;
calculating a first portion of the second electronic payment to be maintained by the first user;
calculating a second portion of the second electronic payment to be transferred to the second user; and
providing information to process an electronic payment of the second portion from the first user to the second user,
wherein any of said steps of calculating are done by a processor.

* * * * *